United States Patent [19]

Craig et al.

[11] 4,114,402

[45] Sep. 19, 1978

[54] FLEXURE HINGE ASSEMBLY

[75] Inventors: Robert J. C. Craig, Malibu; Clifton T. Council, Woodland Hills, both of Calif.

[73] Assignee: Litton Systems, Inc., Woodland Hills, Calif.

[21] Appl. No.: 673,746

[22] Filed: Apr. 5, 1976

[51] Int. Cl. .............................................. F16d 3/52
[52] U.S. Cl. ..................................... 64/15 B; 74/5 F
[58] Field of Search ................... 64/15 B, 15 R, 27 B; 74/5 F; 29/44 S, 558; 308/2 A

[56] References Cited

U.S. PATENT DOCUMENTS

| 3,288,541 | 11/1966 | Tracy | 64/15 B |
| 3,384,424 | 5/1968 | Raines | 308/2 A |
| 3,575,475 | 4/1971 | Boerner | 74/5 F |
| 3,597,938 | 8/1971 | Hellen | 308/2 A |
| 3,700,289 | 10/1972 | Bilinski et al. | 74/5 F |
| 3,709,245 | 1/1973 | Krupick et al. | 74/5 F |
| 3,811,172 | 5/1974 | Bilinski et al. | 29/445 |

Primary Examiner—Samuel Scott
Assistant Examiner—R. C. Turner
Attorney, Agent, or Firm—Harold E. Gillmann

[57] ABSTRACT

A flexure hinge assembly comprising a pair of fixed telescopes inner and outer tubular members separated into at least one driving portion, at least one gimbal portion and at least one driven portion and a plurality of flexure blades all formed by a plurality of slots and apertures through the walls of each tubular member. Flexure blades are formed by pairs of adjacent apertures with the slots interconnecting apertures to separate the tubular members into the driving, gimbal, and driven portions. The four slots of each tubular member which divide that member into these three portions are axially coextensive with the slots in the other member and all extend in the same axial direction from the apertures which form the flexure blades. Such axially coextensive slots displace the driving and the driven portions of the tubular members in the same axial direction from the center of suspension, i.e., from the flexure axes of these portions.

16 Claims, 21 Drawing Figures

FLEXURE HINGE ASSEMBLY

CROSS-REFERENCE TO A RELATED APPLICATION

This application is related to an application, Ser. No. 673,605, entitled "Flexure Hinge Assembly and Method of Manufacturing Therefore" filed this same day by Robert J. G. Craig, Clifton T. Council and Jack F. Jansen, and assigned to the same assignee.

BACKGROUND OF THE INVENTION

This invention relates to a flexure hinge assembly, and, more particularly, to such an assembly for connecting two rotary members while permitting universal movement through small angles between them.

A typical flexure hinge assembly of the prior art is disclosed in U.S. Pat. No. 3,811,172. Other prior art flexure hinge assemblies are referred to in the section entitled "Discussion of the Prior Art." The flexure hinge assemblies disclosed in U.S. Pat. No. 3,811,172 and in the other patents discussed infra each have two pair of diametrically opposed flexure hinges which permit universal movement through small angles between a central gimbal element portion and one end portion and have another two pair of oppositely disposed flexure hinges which permit universal movement through small angles between the central gimbal element portion and the other end portion.

Each flexure hinge comprise a pair of flexure blades with mutually orthogonal planes of flexure. One of each pair of flexure blades forming a flexure hinge is formed by a pair of circumferentially adjacent apertures in the wall of the inner tubular member, the other formed by a pair of circumferentially adjacent apertures in the outer tubular member. Also, in prior art teachings one of the flexure blades in each flexure hinge is oriented to contribute high axial strength along the longitudinal axis of the flexure hinge assembly and, the other blade of the pair is orthogonally oriented to provide the necessary radial stiffness required for an isoelastic suspension.

In cylindrical flexure hinge assemblies of the prior art, the tubular members are separated by flexure blades into an axially displaced driving portion, two gimbal portions and a driving portion. That is, these portions are axially displaced from each other along the longitudinal axis of the flexure hinge assembly. More particularly, axially displaced slots in the walls of each tubular member create a central gimbal portion which is connected to end portions by flexure blades. One end portion is used as a driving element for connecting to a drive shaft, the other as a driven element for mounting an inertial wheel known as a rotor element.

One common arrangement of the basic elements of a gyroscope comprises a motor supported on either side by bearings with the motor shaft projecting through one bearing for a distance sufficiently long for supporting a flexure hinge assembly and rotor mounted thereon. A flexure hinge having tubular driving, gimbal and driven elements formed by axially displaced slots in the tubular members has the disadvantage that the motor shaft projecting outwardly from the motor bearings has a certain amount of compliance which permits vibrations. The flexure hinge assembly and rotor mounted on the motor shaft, respectively, are therefore subject to any such vibrations. Spurious vibrations of the rotor are a source of error in the performance characteristics of a gyroscope.

SUMMARY OF THE INVENTION

The above and other disadvantages of the prior art are overcome by the novel flexure hinge assembly of the invention and the novel method of fabrication therefor. The novel flexure hinge assembly of the present invention comprises a pair of fixed telescoped inner and outer tubular members separated into at least one driving portion, at least one gimbal portion and at least one driven portion and a plurality of flexure blades formed by a plurality of slots and apertures through the walls of each tubular member. Each end of each slot terminates in an aperture. The apertures are arranged in pairs of circumferentially adjacent apertures. Each of the tubular members has four pairs of circumferentially adjacent apertures. In each member the four pairs of apertures are equiangularly spaced around the circumference of the tubular member. The necked-down portion of a tubular member between each pair of adjacent apertures forms a flexure blade. Each pair of radially adjacent flexure blades, one in the inner and one in the outer member, have mutually orthogonal planes of flexure and have a common flexure axis to form a flexure hinge. In most embodiments the flexure axes of all flexure hinges intersect the longitudinal axis of the inner and outer tubular members at a common pivot although not necessarily.

According to the invention the four slots of each tubular member which divide the member into the three elements are axially coextensive all extending in the same axial direction from the apertures which form the flexure blades. Such axially coextensive slots displace the driving and the driven elements in the same axial direction from the center of suspension, i.e., from the flexure axes of these elements, and in most but not all embodiments, from a common pivot point where all flexure axes intersect. Displacement of both driving and driven elements in the same axial direction from the center of suspension permits both the rotor connection to the driven element and the motor shaft connection to the driving element to be located more closely to a motor bearing which reduces the projecting length of the motor shaft, minimizes compliance of the motor shaft and therefore reduces the magnitude of shaft vibrations transmitted to the rotor.

DESCRIPTION OF AN EMBODIMENT HAVING A SINGLE GIMBAL ELEMENT

In FIGS. 1–8 there is shown an embodiment of the invention having a single gimbal element. The preferred method of making this embodiment of the invention is taught in a co-pending application filed this same day by Messrs. Robert J. G. Craig, Clifton T. Council and Jack E. Jansen and assigned to the same assignee. FIGS. 1–8 are identical to FIGS. 1–8 of the referenced co-pending application, respectively. Numbering of the items shown in FIGS. 1–8 corresponds exactly to the numbering of the items in FIGS. 1–8 of the co-pending application the subject matter of which is hereby incorporated by reference. FIGS. 9–14 and the numbering of the items shown therein correspond exactly to FIGS. 9–14 in the referenced co-pending application.

When designing a flexure hinge assembly for a universal joint for use as the suspension for a rotor element from a shaft in a free rotor gyroscope, consideration must be given to the location of the center of suspension, i.e. the location of pivot point 07, along axis 01. The general requirement for fabricating such a suspension is satisfied by a moment of inertia of the gimbal element which is equal and opposite to the spring rate of the flexure blades. If the spin axes of a rotor element (not shown) and of a drive shaft (not shown) are not aligned one with the other each gimbal element must vibrate back and forth to accommodate the relative motion. Since a gimbal element has a finite mass and moment of inertia, it must be acted on by torques to produce this motion, and these torques are produced partly by reactions on the drive shaft and partly by reactions on the rotor element. The reaction torques on the rotor element provide a compensating mechanism. Mathematically, these torques of the gimbal elements are identical to a negative in-phase spring rate. They may be adjusted to make the rotor element precess in a cone but in the opposite direction to the precession produced by the bending action of the flexure hinges. Adjustment of the negative spring rates of the gimbals to cancel the torsional positive spring rates at a particular spin speed of the rotor is known as "tuning" the gyroscope. The conditions of tuning a free-rotor gyroscope having a single intermediate gimbal suspended between a rotor and a shaft are described in an article entitled "Dynamically Tuned Free Rotor Gyroscope" published in *Control Engineering*, June, 1964, pages 67 through 72.

The stiffness of this dynamic negative spring rate is determined by the moments of inertia of the gimbal elements. The general torque expression is given by the stiffness of the negative spring rate:

dynamic spring rate for each gimbal element = $N^2 (C-A-B)$ where $N$ = spin frequency and $A$ and $B$ are gimbal moments of inertia about the flexure axes and $C$ is the moment of inertia of the gimbal moment of inertia about the spin axis and about the flexure axes. The magnitude of the effective spring rate is proportional to the moment of inertia of the gimbal element about the spin axis minus the moments of inertia about the two pivot axes. If the gimbal element were infinitely thin, this expression would approach zero, as the negative spring rate is proportional to the height of the gimbal element in the direction of the spin axis. In practice, the positive spring rates of the individual flexure hinges are preferably matched to one another within an accuracy of about five percent, and the effective height of each gimbal element may be adjusted, if necessary, by means of adjustment screws or by removing material from the gimbal elements so that the total spring rate is substantially zero.

For a gyroscope in the free mode (no capturing) a direct, or as it is called, in-phase net spring rate causes nutation of the rotor element (a slow coning motion) which is directly proportional to the extent the rotor axis is offset from the spin axis. For example, a direct spring rate arises if the spin frequency is different from the tuned frequency of the gimbal suspension, i.e. if the suspension is not perfectly tuned. Torque is developed about the same axis as the initial displacement, which in turn causes the rotor to precess about an axis at right angles to the displacement axis. Since there is no energy dissipation in this spring, the rotor axis of spin does not return to the shaft axis of spin but continues to precess in a cone about the shaft axis.

The magnitude of the in-phase spring rate for off-tuning conditions is $$\dot{\theta}/\theta = (\Delta N)/ F_m$$

where $\Delta N$ is the difference between the tuned frequency and the actual spin frequency and $F_m$ is a term called the figure of merit. $F_m$ for any given instrument is equal to $HN/K_T$, where $H$ is the angular momentum of the rotor element, $N$ is the frequency of rotation, and $K_T$ is the sum of all the torsional spring rates of the hinge suspension. A net in-phase spring rate due to off-tuning is avoided by adjusting the moments of inertia of the gimbal elements in the manner taught below. The flexure hinge assembly of the invention may be implemented in a gyroscope which is substantially free from error torques arising because of the rectification of angular vibrations occurring at a frequency equal to twice the spin frequency of the rotor element. Ball bearings utilized to support the shaft produce angular vibrations at harmonics of the spin frequency. Unless compensatory adjustments are made, tuned-rotor gyroscopes will rectify such angular vibrations at twice the spin frequency. The effect can be severe, typically of the order of 5°/hr/per arc second amplitude of the vibration at a frequency of twice the spin frequency. Such rectified error torques may be substantially avoided by proper design of the theoretical moments of inertia of the gimbal elements and, if necessary, adjustment of the actual moments of inertia.

To explain this effect more fully, an example is given wherein the flexure hinges along one flexure axis of a gimbal element are relatively stiff compared to hinges along the other flexure axis of the gimbal element. If the gyroscope is subjected to angular vibration, the hinges must bend by an amount equal to the amplitude of the vibration, thus producing a direct spring torque on the rotor element. Normally these spring torques will average to zero over each cycle of vibration, but not in the case of synchronous vibration at twice the spin frequency 2N. In the worst case the positive half-cycles of angular displacement will bend a stiff flexure hinge, while the negative half-cycles will bend a weak, i.e. a less stiff, flexure hinge. The result is a net average torque on the rotor element. For actual flexure hinges this effect can be practically avoided by careful design of the spring rates of the flexure hinges.

However, the negative dynamic spring rate produced by the motion of each gimbal element is highly asymmetrical. To explain this phenomenon more fully, assume that an angular rate is applied about an axis fixed with respect to the housing of the instrument. The torque transmitted to the rotor element at any given instant is a function of the position of the rotor element at that instant. For a single gimbal element it can be seen that the gimbal element is coerced to follow the shaft angular rate when the shaft-attached flexure axis is at right angles to the axis of the input rate, but is not coerced to follow the shaft when it is in line with the axis of the input rate (because of its low torsional stiffness). Essentially, then, the rotor element is alternately torqued with high gyroscopic torques when the input angular rate acts on the drive shaft about the rotor-attached flexure axis of a gimbal element, but it is not torqued with high gyroscopic torques when the input angular rate on the drive shaft acts about the shaft-attached flexure axis of that gimbal element. If a condition can be met such that the high angular rates in one direction occur when there is strong gyroscopic coupling to the rotor element, but for the high angular rates in the opposite direction the transmitted torques are very weak, then there will be a net rectification in favor of the high-coupling direction. Such a condition does exist for angular vibration inputs at twice the spin frequency and only at this frequency. Analysis has shown, however, that this rectification effect is canceled by the torques applied to the rotor element by a properly matched second gimbal element attached at right angles to the first, and has its moment of inertia matched to effectively cancel the torque vectors of the two gimbal elements.

The flexure hinge assembly of the invention may be fabricated in embodiments having two independent gimbal elements, with gimbal inertias designed to achieve cancellation of the spring rates and cancellation of torques due to vibrations about case-fixed input axes at twice the spin speed. For example, the gimbal elements will rectify 2N vibration, but the rectification torques will be equal and opposite, provided that the gimbal elements are carefully matched for this characteristic. Matching may be accomplished with balance weights or material may be removed from a gimbal element. U.S. Pat. No. 3,678,7654 more completely describes the equations of motion of such a gyroscope, the tuning conditions, and the conditions for substantial suppression of errors caused by torques applied at a frequency of twice the rotor rotational rate, i.e. the spin frequency.

The flexure hinge assembly shown in FIGS. 1-8 includes an inner tubular member 00 having a longitudinal axis 01 and an outer member 02 both formed of high strength steel having good spring characteristics. Members 00 and 02 are telescoped one within the other and fixed in an angular relationship with respect to one another about longitudinal axis 01.

Figure 1:
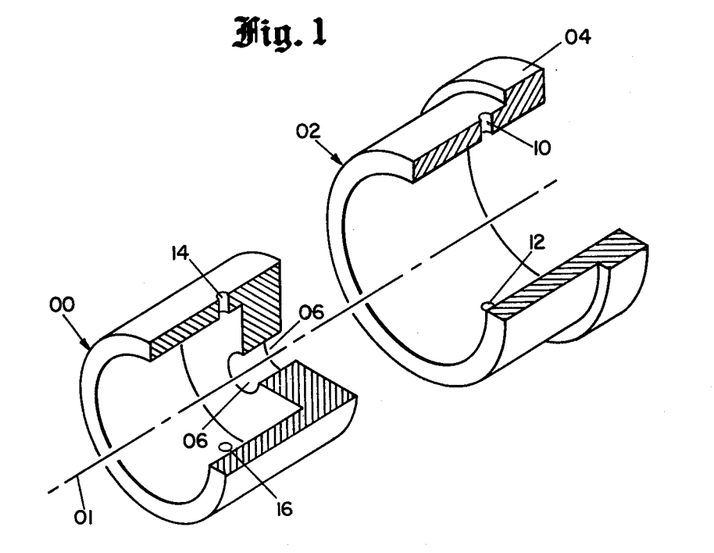
FIG. 1 is an exploded view, taken in perspective, of the inner and outer tubular members.

Outer tubular member 02 is a right circular cylinder having a flange 04 at one end. Flange 02 provides a mount for an inertial wheel, i.e. a rotor (not shown). Member 02 is substantially a right circular cylinder of bar stock ground to create a flange 04 as shown in FIG. 1.

Inner tubular member 00 is also formed of bar stock. The bar may be drilled or hogged out to form a cup (not shown), i.e. a right circular cylinder having one closed end.

Apertures 40 and 42 of outer tubular member 02 form flexure blade 44; apertures 46 and 48 form flexure blade 50; apertures 52 and 54 form flexure blade 56; and apertures 58 and 60 form flexure blade 62.

Apertures 64 and 66 of inner tubular member 00 form flexure blade 68; apertures 70 and 72 form flexure blade 74; apertures 76 and 78 form flexure blade 80; and apertures 82 and 84 form flexure blade 86.

A plurality of slot cuts divide each of the tubular members into a driving portion, a gimbal portion and a driven portion. More particularly, a slot cut connects one of each pair of apertures forming a flexure blade to the circumferentially closest aperture of the next pair of apertures at an interval of 90° about the longitudinal axis of the tubular member. The slot cut may be considered as three separate slots. From each aperture there is a slot extending in an axial direction which is parallel to the longitudinal axis. A slot which is perpendicular to the longitudinal axis of the tubular member connects the parallel slots of the two apertures located at approximately 90° intervals. This perpendicular slot is actually displaced from the pivot point 07. In accordance with the invention each of the perpendicular slots cuts is axially displaced in the same direction from the pivot point. In the embodiment shown in FIGS. 1-8 the perpendicular slots cut the walls of inner and outer tubular members 00 and 02 in a plane.

In the embodiment of FIGS. 1-8 the parallel slots of the inner and outer tubular members 00 and 02 are radially adjacent and are preferably formed by the same EDM cutting tool passing through both members as described below. Similarly the perpendicular slots of inner and outer tubular members 00 and 02 are radially adjacent and are preferably formed by the same EDM cutting tool passing through both the inner and outer tubular members.

Not all of the slots are shown in FIGS. 1-8. A complete understanding of the slots of the embodiments of FIGS. 1-8 may be had by referring to the corresponding slots of the embodiment of FIGS. 9-13. Corresponding items in FIGS. 9-13 and FIG. 4 are numbered at intervals of 200 and 400, respectively. For example, aperture 240 in FIGS. 9-13 corresponds to aperture 40 in FIGS. 1-8.

The parallel slots of the outer tubular member 02 and 88 and 90; 92 and 94; 96 and 98; and 100 and 102. The parallel slots of the inner tubular member 00 are 104 and 106; 108 and 110; 112 and 114; and 116 and 118.

The perpendicular slots of the outer tubular member 02 are 120, 122, 124, and 126. The perpendicular slots of inner tubular member 00 are 128, 130, 132, and 134.

The slots in outer tubular member 02 from aperture to parallel slot to perpendicular slot to parallel slot to apertures are 42, 90, 120, 92, and 52; 54, 94, 122, 96, and 64; 66, 98, 124, 100, and 76; and 78, 102, 126, 88, and 40.

The slots in inner tubular member 00 from aperture to parallel slot cut to perpendicular slot cut to parallel slot cut to aperture are 48, 106, 128, 108, and 58; 60, 110, 130, 112 and 70; 72, 114, 132, 116, and 82; and 84, 118, 134, 104, and 46.

Four axial slots 136, 138, 140 and 142 in the closed end of inner tubular member 00 and in adjacent end of outer tubular member 02 partition the members into a gimbal portion connected to a driving portion and to a driven portion interconnected by a plurality of flexure blades. Outer tubular member 02 is thus partitioned into outer driving portion 148a and 148b, outer gimbal portion 152, and outer driven portions 154a and 154b. Inner tubular member 00 is partitioned into inner driving portions 158a and 158b, hub 160, inner gimbal portion 162, and inner driven portions 164a and 164b. The following elements are bonded together 148a and 158a, 148b and 158b; 152 and 162; 154a and 164a; and 154b and 164b.

In accordance with the principles stated above, the location of pivot point 07 along axis 01 is calculated to make the moment of inertia of the finally remaining portions of members 00 and 02 in one axial direction from pivot point 07 equal in magnitude to the moment of inertia of the finally remaining portions of inner and outer tubular members 00 and 02 in the opposite axial direction from pivot point 07. The mass of inner and outer tubular members 00 and 02 used for this calculation does not include material removed for the apertures or the slots which are described below as dividing members 00 and 02 into a driving element, a gimbal element and a driven element or material of members 00 and 02 radially disposed inwardly from flange 04. All of the embodiments shown herein have gimbal inertia(s) which cancel the spring rate of the flexure blades. Some of the embodiments have gimbal elements connected to cancel rectified torques arising due to angular vibrations at twice the rotor rotational frequency.

DESCRIPTION OF THE PREFERRED METHOD OF FABRICATION

In the first step of manufacturing the embodiment shown in FIGS. 1–8 the outer diameter of inner tubular member 00 is ground to a predetermined length. Next, aperture 06 is drilled in the closed end of inner tubular member 00. Aperture 06 is of a size to fit a drive shaft (not shown). The inner diameter of outer tubular member 02 is lapped to obtain a fit between members 00 and 02 known to machinists as a "push fit." The fit between members 00 and 02 must be such that they can be separated one from the other. Inner and outer tubular members 00 and 02 are telescoped one within the other in a coaxial position and then ground to the same length.

An indexing block 09 may be used to facilitate fabrication of a flexure hinge assembly from the coaxially positioned inner and outer tubular members 00 and 02. Indexing block 09 is adapted to be rotated 360° in 90° steps about axes 01, and rotated 360° in 90° steps about axis 03, i.e. 360° in a horizontal plane. Axes 01, 03 and 05 are all shown in FIG. 2. Indexing block 09 can be precisely positioned at intervals of 90° about axis 01 and precisely positioned at intervals of 90° about axis 03. The operation of indexing block 09 is described in terms of axis 03 only for convenience. Axes 01, 03 and 05 are fixed axes shown for illustrating the method of fabrication and do not rotate as members 00 and 02 are rotated. Alternatively, tooling rotatable about the circumference of members 00 and 02 could be utilized.

Radial indexing holes 10 and 12 and radial indexing holes 14 and 16 are drilled along colineal diameters of outer tubular member 02 and inner tubular member 00, respectively. Conventional machining techniques are utilized to drill holes 10 and 14 together and holes 12 and 16 together. These radial holes are utilized for maintaining precise alignment between members 00 and 02 during the subsequent steps of fabrication of the flexure hinge assembly as described below.

Figure 2:
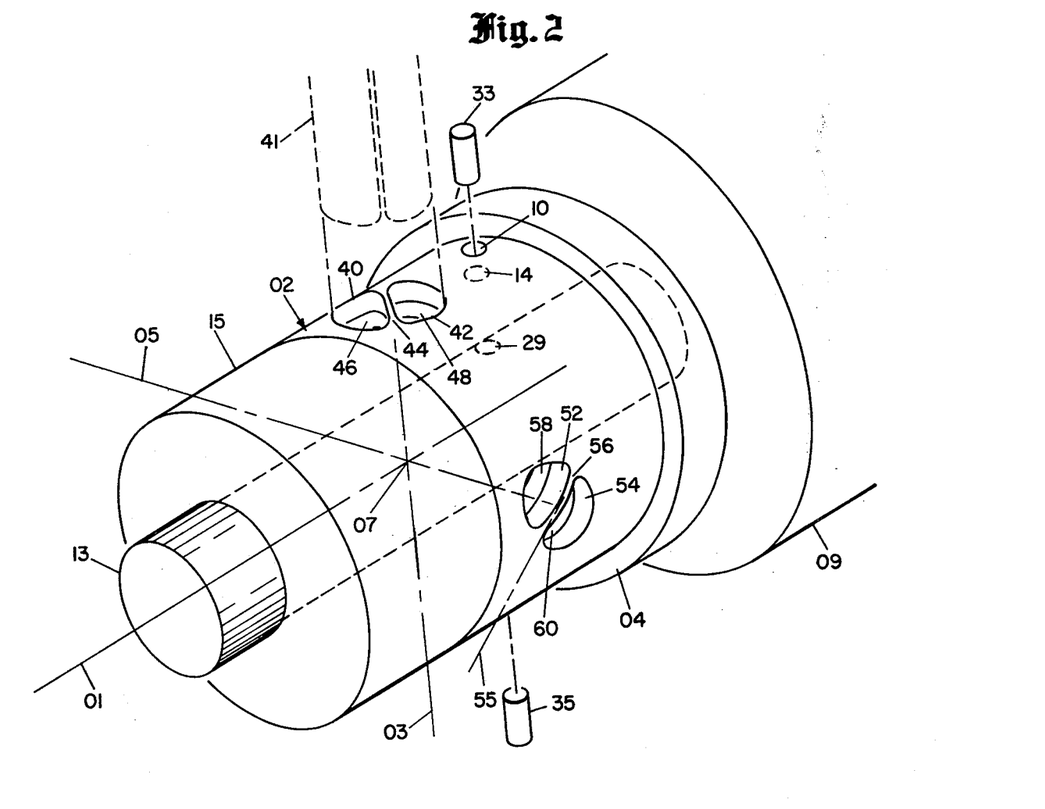
FIG. 2 is a perspective view of the inner and outer tubular members mounted in a first relative angular position.

A spud 13 and a washer 15, shown in FIG. 2, are utilized to mount the coaxial members 00 and 02 onto indexing block 09. Washer 15 has substantially, though not necessarily, precisely the same diameter as the outer diameter of outer tubular member 02. Spud 13 clamps members 00 and 02 between washer 15 and indexing block 09. Spud 13 has radially extending indexing holes 29 and 31. Indexing hole 31 is not visible in FIGS. 1–8. Spud 13 is designed so that the center lines of holes 10, 12, 14, 16, 29 and 31 coincide to lie upon a common line when members 00 and 02 are mounted to indexing block 09.

Indexing pins 33 and 35 are utilized to maintain alignment between members 00 and 02 and the indexing block 09 during fabrication. Pin 33 is inserted into holes 10 and 14 and pin 35 into holes 12 and 16. Members 00 and 02 are then mounted in coaxial position on indexing block 09 using spud 13 and washer 15. Members 00 and 02 are then rotated about their common axis 01 until the indexing pins 33 and 35 can be pushed into holes 29 and 31, respectively. Spud 13 is then tightened to hold members 00 and 02 clamped in a coaxial position.

A flexure hinge assembly is to be formed from inner and outer tubular members 00 and 02 by removing material from these members to create a vibrating gimbal element connected to a driving element and to a driven element by a plurality of four flexure hinges. Each flexure hinge comprises two orthogonal flexure blades with one blade in the wall of one tubular member and the other blade in the wall of the other tubular member. The flexure axes, i.e. the axes about which the flexure blades bend, are radials. The flexure hinges are spaced at 90° intervals about the circumference of inner and outer tubular members 00 and 02. Therefore the four flexure blades of two diametrically opposed flexure hinges share the same flexure axis 03 and the four flexure blades of the other pair of diametrically opposed flexure hinges share a common flexure axis 05. Axes 01, 03 and 05 intersect at a common pivot point 07 which will be the center of suspension of the flexure hinge assembly when completed.

Flexure blades are made by forming a pair of adjacent apertures in the wall of member 00 and 02. References related to the fabrication of flexure blades in cylinders are included in the patents discussed in the following section entitled "Discussion of the Prior Art." Particular reference is made to U.S. Pat. Nos. 3,527,062; 3,700,289; 3,700,290; 3,811,172 and 3,856,366, and an article entitled "How to Design Flexure Hinges" by J. M. Paros and L. Weisbord which was published in *Machine Design*, Nov. 25, 1965, pages 151 through 156.

Each flexure blade has a plane of flexure which includes a flexure axis about which the flexure axis bends and also includes a longitudinal axis which is perpendicular to the flexure axis.

Each flexure blade defines and thus has a plane of flexure which includes the flexure axis 03 or 05 about which the flexure blade bends and also includes a longitudinal axis of the flexure hinge which is perpendicular to the flexure axis. The axis of symmetry is also known as the longitudinal axis of a flexure blade. Flexure plane 55 is shown in FIG. 2 as an example of the flexure plane of each flexure hinge.

Referring now particularly to FIG. 2, apertures 40 and 42 are shown as they are formed by means of a tool 41. Tool 41 is an electrical discharge machining (EDM) tool. Electrical discharge machining is a known process for forming flexure blades. Patents discussing EDM techniques are mentioned further below in the section of this description entitled "Discussion of the Prior Art," see particularly U.S. Pat. No. 3,585,866 and a handbook of machining procedures entitled "Electrical Machining, Spark-Erosion Machines, Technology Generators" which is available from the Charmilles Engineering Works Ltd., Geneva, Switzerland. Electrical discharge machining is described in a book entitled "Electrical Discharge Machining for the 1970's" by Leland J. Quackenbush and William N. Lawrence. The book is available from the Industrial Development Division Institute of Science and Technology, The University of Michigan, 2200 North Campus Boulevard, Ann Arbor, Michigan 48105, U.S.A.

A Charmilles D10 electrical discharge machine may be utilized with electrodes especially designed to make cuts creating apertures and slots in tubular members 00 and 02.

Referring now to FIGS. 2-8 each radially inwardly occurring plunge of EDM tool 41 creates a pair of apertures 40 and 42 and 54 and 58 which are separated by a thin flexure blade 44 and 56 in the cylindrical wall of the outer tubular member 02 and inner tubular member 00, respectively, with the flexure blades formed through both tubular members by a single plunge being created simultaneously and mutually aligned, i.e. coplanar. According to the steps of the method of the invention thus far explained, a precise flexure hinge assembly is fabricated by mounting a pair of tubular members in a coaxial, telescoped position, and forming pairs of coplanar, radially adjacent flexure blades in the inner and outer tubular members. As will be discussed further below, these steps are followed by cutting slots into the tubular members which slots interconnect pairs of apertures, followed by rotating the inner and outer tubular members with respect to one another and securing portions of one to portions of the other in the rotated position, thereby to form a plurality of flexure hinges, each flexure hinge comprising a pair of mutually orthogonal flexure blades, one flexure blade in the outer tubular member and one flexure blade in the inner tubular member on a common flexure axis. The pattern of flexure blades is selected to permit firstly forming a pair of radially adjacent flexure blades at intervals of 90° about the circumference of the tubular members, followed by rotating the tubular members with respect to one another through a predetermined angle, thereby to create four flexure hinges of which each have a pair of mutually orthogonal flexure blades.

From the illustration in FIG. 2 it can be seen that each flexure blade, such as the visible flexure blades 44 and 56, is formed by a very thin remainder of the cylindrical wall of a tubular member, as it remains between two apertures. A flexure blade is then a substantially thin flat, two-dimensional element defining a plane 55 which extends through it and separating the two apertures. This plane is referred to herein as the flexure plane for each flexure blade. Flexure plane 55 is shown in FIG. 2 as an example of a flexure plane.

Orthogonality of the flexure blades of each flexure hinge results in the effect that the flexure hinge assembly will have the desired, substantially equal translational stiffness in the radial and axial directions. This characteristic is known as isoelasticity. Neither flexure plane of the flexure blades of a flexure hinge need be parallel or perpendicular to the longitudinal spin axis of the flexure hinge assembly. In most of the embodiments shown herein, the two flexure planes of each flexure hinge form angles of 45° with the common, or spin axis but in opposite directions. Experimentation with a particular flexure hinge assembly will indicate any deviation from such a 45°—45° pattern needed to achieve isoelasticity. Of course a 0°-90° pattern may also be used.

It may be seen from FIGS. 2-8 that one plunge of tool 41 will create apertures 40 and 42 in outer tubular member 02 and apertures 46 and 48 in inner tubular member 00. The portion of member 02 between apertures 40 and 42 comprises flexure blade 44. Similarly flexure blade 50 is created between apertures 46 and 48.

Indexing block 09 is then rotated by 90° about axis 01 and secured in the new 90° offset position. The next plunge of tool 41 forms apertures 52 and 54 in outer tubular member 02 and apertures 58 and 60 in inner tubular member 00, creating flexure blades 56 and 62 respectively.

Indexing block is now rotated 90° clockwise in a horizontal plane about axis 03, and rotated 90° about axis 01. In the embodiment of FIGS 1-8 flexure hinges will ultimately be formed by rotating inner and outer members 180° with respect to one another. If tool 41 were again plunged through members 00 and 02 without a rotation of 90° about axis 03, the forthcoming rotation of members 00 and 02 with respect to one another would not result in mutually orthogonally oriented, radially adjacent flexure blades. Rather, the radially adjacent flexure blades after such rotation would still be coplanar, i.e. the flexure planes of the flexure blades would still be parallel, which means they would coincide one with the other.

The next plunge of tool 41 forms apertures 64 and 66 in outer tubular member 02 and apertures 70 and 72 in inner tubular member 00, thus creating flexure blades 68 and 74 respectively.

Indexing block 09 is rotated 90° clockwise about axis 01. No rotation of indexing block 09 about axis 03 is made in this position. Tool 41 is plunged through members 00 and 02 to form apertures 76 and 78 in member 02, as well as apertures 82 and 84 in member 00, thus creating flexure blades 80 and 86 respectively.

The indexing block is next rotated 90° clockwise about axis 01 and 90° counterclockwise about vertical axis 03, to return the block to its initial position.

Figure 3:
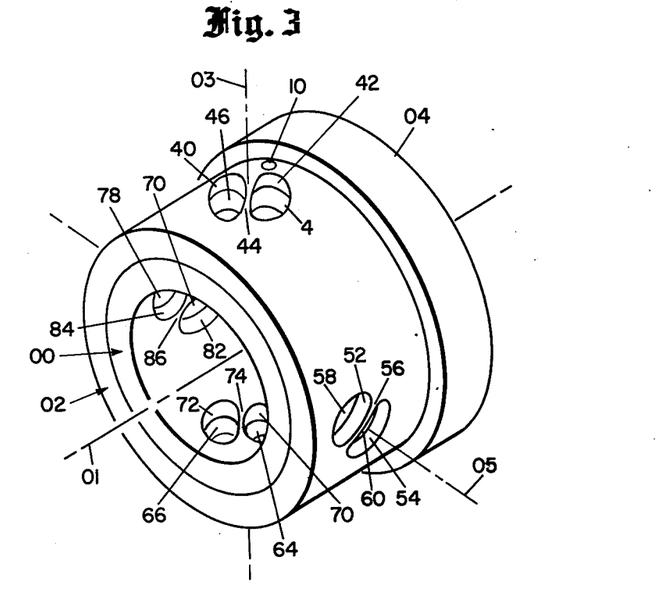
FIG. 3 is a perspective view of the inner and outer tubular members showing completed apertures and pairs of radially adjacent flexure blades having coplanar flexure planes.

In order to summarize the steps in which the sixteen apertures are produced, it can be seen that every group of two, radially adjacent pairs of apertures are produced in a single pass of tool 41. With the orientation of tool 41 as shown in FIG. 2, the two pairs of apertures 40, 42 in member 02 and apertures 46, 48 in member 00 are produced as seein in FIGS. 2 and 3. Upon the first 90° rotation about axis 01, the second two pairs of apertures 52, 54 and 58, 60 are formed. For the production of the next two pairs of apertures 64, 66 and 70, 72 which are not visible in FIG. 2 but shown, for example, in FIG. 3, the assembly will again be rotated by 90° about axis 01, and the same statement again applies for the fourth and last two pairs of apertures 76, 78 and 82, 84, visible in FIGS. 2 and 3. As also illustrated in FIG. 3 and explained in more detail below, for the two last-produced pairs of apertures which are seen inside of the assembly as viewed in FIG. 3, for purposes of this embodiment, it would be necessary that the tool 41 be rotated about its own axis, coinciding with axis 03 in FIG. 2, in order to leave flexure blades, such as blades 74 and 86 in the inner tubular member 00, between the apertures which flexure blades are oriented at 90° with respect to the flexure blades between the two first-produced pairs of apertures. Since the tool 41 is fixed in the electrical discharge machine, it was found that it is more practical to proceed as set forth above, namely that the assembly of the two tubular members 00 and 02 be rotated about the axis 03, and this has, of course, the same effect as if such rotation would not occur, but the tool 41 had been rotated. The different orientation of the apertures and therewith of the flexure blades between the apertures, when produced in the first, second, third and fourth areas 90° apart, and formed in that sequence, which has been selected for the illustration and description above, has the purpose already mentioned above, namely that, upon termination of the machining process, when the two tubular members 00 and 02 have been rotated one with respect to the other by 180°, those flexure blades which thereby become radially adjacent one to the other will form the 90° angles required for the conditions of equal torsional stiffness to create the required isoelasticity.

In the immediately following steps, parallel slots will be formed in the walls of the inner and outer tubular members 00 and 02. For embodiments where slots parallel to the longitudinal common axis 01 are radially in alignment, a slot may be formed in both outer and inner tubular members simultaneously, i.e. by a single pass of the tool. Where slots are not in radial alignment, the inner and outer tubular members must be separated and the slots made separately in each member. Some of the embodiments have slots made separately in each member. Some of the embodiments have slots parallel to axis 01 which include not only radially adjacent, aligned slots but two pairs of slots on opposite sides of members 00 and 02 which are in alignment. Such pairs of juxtaposed, aligned slots may be made by a variation of the general method of fabrication described in the cross-referenced application.

Figure 4:
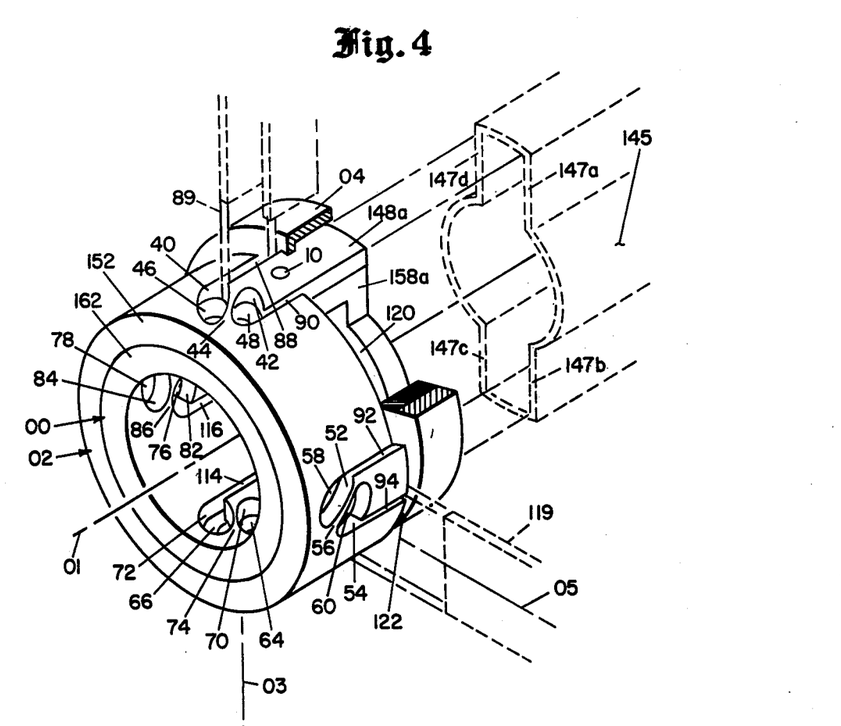
FIG. 4 is a perspective view of the inner and outer tubular members showing an example of tooling used to form the slots therein.
Figure 5:
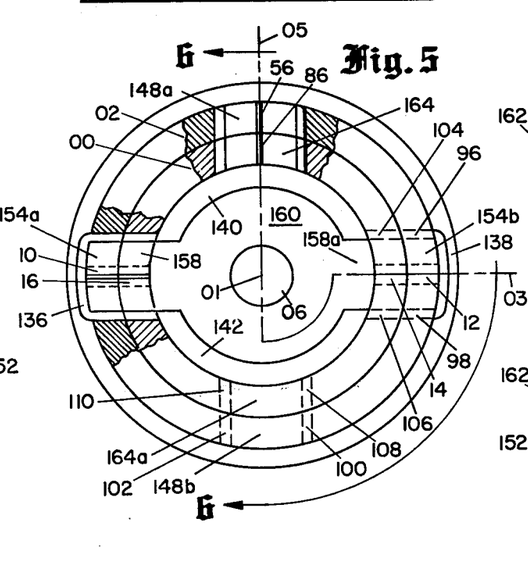
FIGS. 5, 6, 7 and 8 comprise an orthographic projection of the completed flexure hinge assembly having a single gimbal element.
Figure 6:
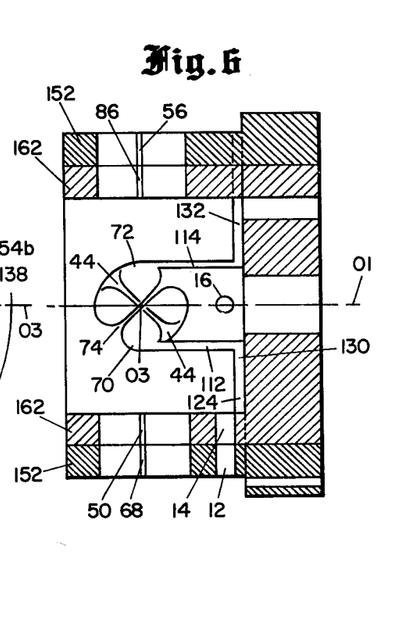
Figure 7:
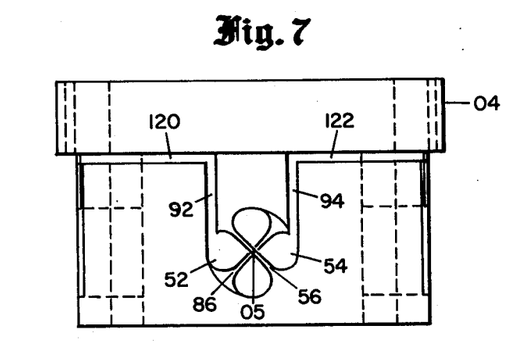
Figure 8:
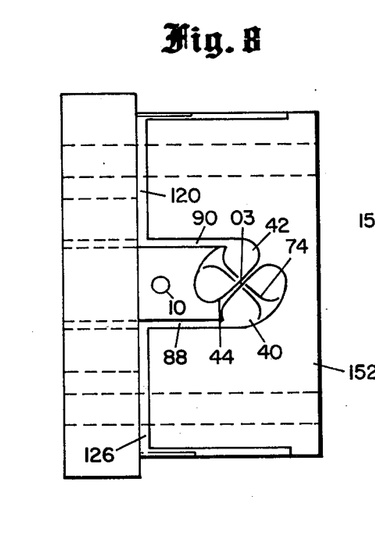
Figure 9:
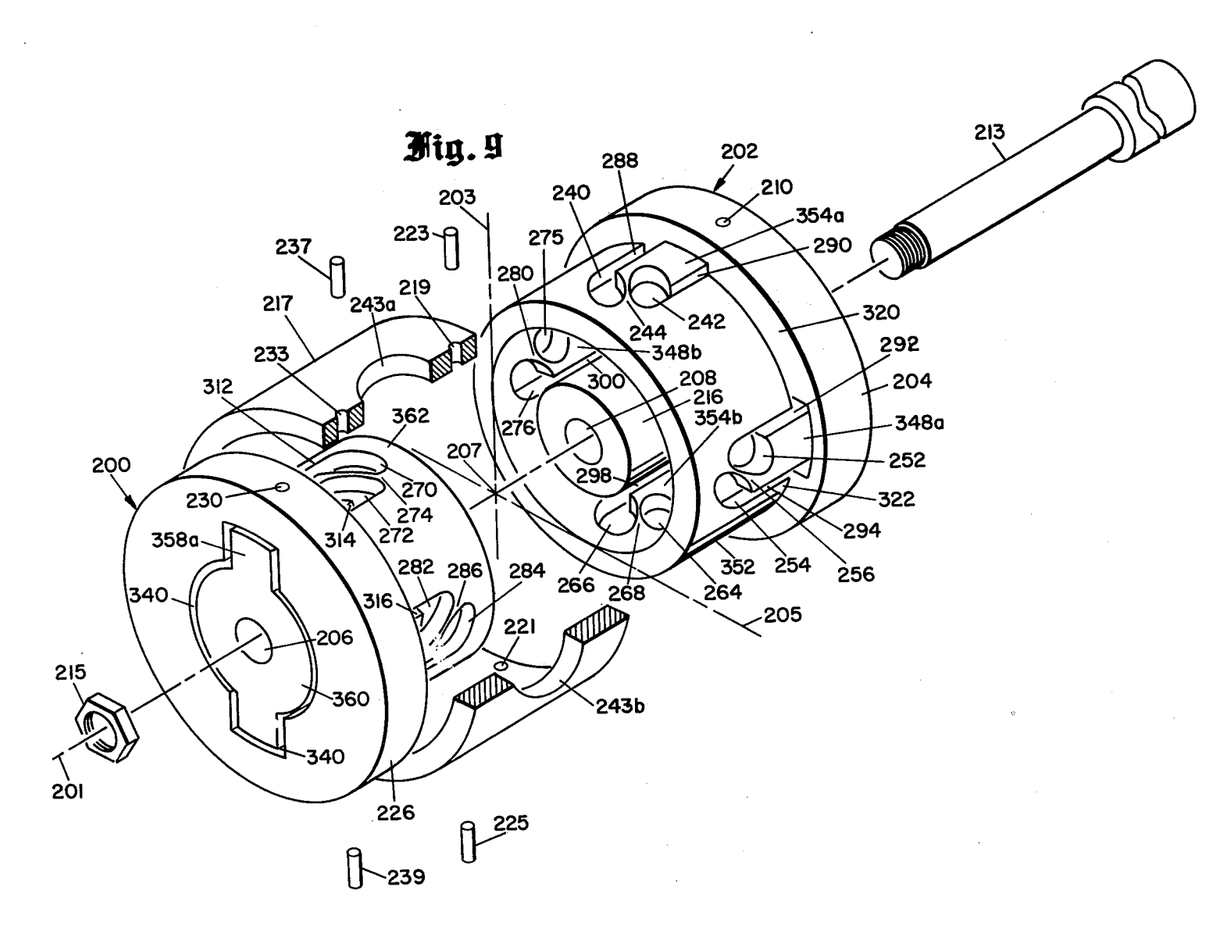
FIG. 9 is an exploded view, taken in perspective, of an embodiment of the invention having two independent gimbal elements.

Continuing now with a description of the general method of fabrication, slots parallel to axis 01 are formed in inner and outer tubular members 00 and 02 without removing members 00 and 02 from their coaxial position on spud 13. Tool 41 is removed from the electrical discharge machine and tool 89 is substituted. Tool 89 is another EDM tool which may be a single tool as shown in FIG. 4. Tool 89 is shown positioned to form slot 88. Tool 89 may then be moved along axis 05 into the correct position to form slot 90. Tool 89 may also be a double-bladed tool, as shown, which would simultaneously form slots 88 and 90. The following description assumes the use of a double-bladed tool.

The first plunge of such double-bladed tool 89 forms slots 88 and 90 in outer tubular member 02 and slots 104 and 106 in inner tubular member 00. Indexing block 09 is then rotated 90° clockwise about axis 01. The next plunge of tool 89 forms slots 92 and 94 in member 02 and slots 108 and 110 in member 00.

Indexing block 09 is again rotated 90° clockwise about axis 01. The next plunge of tool 89 forms slots 96 and 98 in member 02 and slots 112 and 114 in member 00.

Indexing block 09 is again rotated 90° about axis 01. The final plunge of tool 89 forms slots 100 and 102 in member 02 and slots 116 and 118 in member 00. The indexing block may then be rotated 90° clockwise to return members 00 and 02 into their original position.

Reference is made to the tool 119 shown in FIG. 4. Tool 119 is another EDM tool used to form slots in the walls of members 02 and 00. It will be seen from the orientation of tool 119 with respect to members 00 and 02 that the plunge of tool 119 will create slots in members 00 and 02 which are generally orthogonal to the direction of the common axis 01. In FIG. 4, tool 119 is shown plunging in a direction orthogonal to axis 01 and to the direction of the plunge of tool 89 and tool 41. The direction of the plunge of tools 41 and 89 has been illustrated as the vertical direction. In practice, tool 119 would be substituted for tool 89 and would thus also move along a vertical line. The following description resumes with apertures 40 and 42 and slots 88 and 90 being uppermost and assumes that tool 119 is substituted in the position of tool 89 rather than in the position it is shown.

The first plunge of tool 119 forms slots 120 and 128 in members 02 and 00 respectively. Slot 120 connects with slot 90 and slot 92. Slot 128 connects with slot 106 and slot 108. Thus there is a continuous slot between apertures 42 and 52 and apertures 48 and 58.

Indexing block 09 is rotated 90° clockwise about axis 01. The next plunge of tool 119 form slots 122 and 130 in members 02 and 00 respectively. Slots 94, 122 and 96 connect apertures 54 and 64. Slots 110, 130 and 112 connect apertures 60 and 70. Not all slots are shown in FIGS. 4-8. Corresponding numerals are used in other embodiments described further below. They may be referred to as an aid to understanding the interconnection of the slots, see particularly FIG. 11b and FIG. 11c. It will be recalled that corresponding items in the various embodiments are numbered at intervals of 200.

Indexing block 09 is again rotated 90° clockwise about axis 01. The next plunge of tool 119 forms slots 124 and 132 in tubular members 02 and 00 respectively.

Indexing block 09 is then rotated clockwise about axis 01 through an angle of 90° to the 270° position. The next plunge of tool 119 forms slots 126 and 134 in tubular members 02 and 00.

After producing all apertures, axial slots and peripheral slots, as described, tubular members 00 and 02 are removed from indexing block 09 by disengaging index pins 33 and 35 from index holes 29 and 31 respectively. However, index pin 33 and 35 are not entirely removed and continue to pin inner and outer tubular members 00 and 02 in a precise alignment with respect to one another. Spud 13 is removed from indexing block 09 thereby freeing the assembly of the inner and outer tubular members 00 and 02.

Using conventional machining techniques, tubular members 00 and 02 may be mounted to facilitate a vertical plunge of an EDM tool along longitudinal axis 01. Reference is made to FIG. 4 wherein a fourth EDM tool 145 is shown. EDM tool 145 is shaped to cut longitudinal slots in tubular members 00 and 02. Slots 136, 138, 140 and 142 may be best understood by reference to FIG. 5. Slots 136, 138, 140, and 142 complete the partition of tubular members 00 and 02 into a driving element, a gimbal element, and a driven element.

Tool 145 is plunged into members 00 and 02 along axis 01. Tool 145 is shown in a horizontal position in FIG. 4 for convenience of illustration. The plunge of tool 145 would normally be in a vertical direction, as discussed above. The plunge of tool 145 creates outer driving elements 148a and 148b, outer gimbal element 152, outer driven elements 154a and 154b, inner driving elements 158a and 158b, hub 160 and inner gimbal element 162 and inner driven elements 164a and 164b. Use of the term "outer" refers to outer tubular member 92. Use of the term "inner" refers to inner tubular member 00.

Tool 145 is shown as a single tool forming a unit. In practice, this tool may be replaced by several different EDM tools each of which is designed to cut a different portion of the entire cut made by tool 145 as illustrated. For example, one tool could make the circular portions of the cut and a second tool could make the U-shaped portion at each end of the cut. Other divisions of the outline of tool 145 are of course possible.

Once all steps involving electrical discharge machining are terminated, one of the two tubular elements 00 and 02 is rotated about 180° with respect to the other and held in this position with indexing pins.

Next, each portion of each element in the inner tubular member is bonded to portions of the corresponding portion of the same element in the outer tubular member. Outer driving element portion 148a is bonded to inner driving element portion 158a. Outer driving element portion 148a is bonded to inner driving element portion 158b. There is now a rigid connection between outer driving elements 158a and 158b and a drive shaft (not shown) which would mount in aperture 06. This rigid connection is through inner driving elements 148a and 148b and hub 160.

Outer gimbal element 152 is bonded to inner gimbal element 162. It will be recalled that the tubular members 00 and 02 had a "push fit" telescoped coaxial position one with respect to the other. Bonding of the inner and outer gimbal elements 152 and 162 respectively creates a single gimbal element which will exhibit dynamic characteristics in response to rotor disturbances as taught in U.S. Pat. No. 3,678,764.

Outer driven elements 154a and 154b are bonded to inner driven elements 164a and 164b respectively. Thus, there is a rigid connection between inner driven elements 164a and 164b and a rotor (not shown in FIGS. 1-8) through flange 04 and outer driven elements 154a and 154b.

The indexing pins are then removed from the completed flexure hinge assembly.

DESCRIPTION OF THE METHOD OF MAKING AN EMBODIMENT OF THE INVENTION HAVING A PAIR OF GIMBAL ELEMENTS

Referring now to FIGS. 9-13, there is shown therein inner tubular member 200 and outer tubular member 202. For convenience of illustration, FIG. 10 shows members 200 and 202 in an exploded view. Members 200 and 202 have a colineal longitudinal i.e., common axis 201. In this embodiment of the invention, a driving element, a gimbal element and a driven element will be formed from each of members 200 and 202. In other words, this embodiment will have two intermediate gimbal elements capable of moving independently through small angles. The theory and dynamic characteristics of a flexure hinge assembly having two gimbal elements is described in U.S. Pat. No. 3,678,764.

In this embodiment, flexure hinges which interconnect a driving element to a gimbal element and a gimbal element to a driven element are formed in the manner described above for the embodiment of FIGS. 1-8. The flexure hinges are each comprised of a pair of flexure blades having a common flexure axis. Orthogonal axes 203 and 205 are identified as the flexure axes which are perpendicular to axis 201.

Each of the members 200 and 202 comprises a right circular cylinder having a closed end and a flange at the closed end. Outer tubular member 202 includes flange 204. The closed end of member 202 has an aperture 208 formed therein for receiving a drive shaft (not shown). Flange 204 has two diagonally opposite radial indexing holes 210 and 212 drilled therein. A coaxial cylindrical member 216 may be a part of outer tubular member 202 or it may be a separate member. In order to perform the general method of fabrication of the embodiment of FIGS. 9-13 and FIG. 14 it is not necessary that cylindrical member 216 be separate from the portions of outer tubular member 202 descrived above. Cylindrical member 216 is a spacer which limits the nesting of member 202 in member 200. More particularly, cylindrical member 216 spaces the open end of each tubular member from the flange of the other tubular member when the tubular members are in their normal, nested position, see FIG. 11. Members 200 and 202 are mounted on spud 213, FIG. 9, in a nested position. Nut 215 holds members 200 and 202 in a nested position on spud 213 with cylindrical member 216 abutting the inner, closed end of member 200. Tooling sleeve 217 is a sleeve used to maintain a precise angular alignment of members 200 and 202 with respect to each other. Tooling sleeve 217 has radial indexing holes 219 and 221 which have center lines on the same diameter as holes 210 and 212. Indexing pins 223 and 225 are inserted through radial indexing holes 219 and 210 and through radial indexing holes 221 and 212, respectively.

Inner tubular member 200 has a flange 226 similar to flange 204 on outer tubular member 202. Flange 226 has two radial indexing holes 228 and 230 drilled therein. Inner tubular member 200 has an aperture 206 for receiving a drive shaft (not shown) which also passes through aperture 208 in outer tubular member 202. Sleeve 217 has two radial indexing holes 233 and 235 with center lines on the same diameter as radial indexing holes 228 and 230. Indexing pins 237 and 239 are inserted in radial indexing holes 233 and 228 and 235 and 230. FIG. 10 illustrates members 200 and 202 after member 200 has been rotated 180° with respect to member 202 to create pairs of mutually crossing radially adjacent flexure blades, similar to those of the embodiment of FIGS. 1-8, the method for producing the flexure blade 35 being described in detail below.

In the embodiment shown in FIGS. 9-13 the inner diameter of outer tubular member 202 is larger than the outer diameter of inner tubular member 200. In other words there is no "push fit" as described above with respect to the embodiment of FIGS. 1-8. Also, the inner diameter of inner tubular member 200 is larger than the outer diameter of the cylindrical member 216. Thus, each of the two gimbal elements to be formed at the open end of members 200 and 202, respectively, will be free to move through small angles without coming into contact with the other gimbal element.

Of course, the radial indexing holes in flanges 204 and 226 must be drilled separately.

Pairs of adjacent apertures are formed in the walls of members 200 and 202 in the manner described with respect to the embodiment of FIGS. 1-8.

Figure 10A:
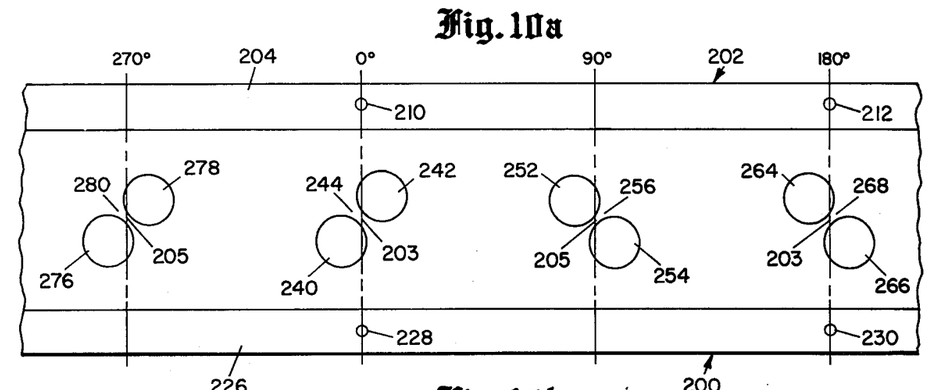
FIGS. 10a, 10b, 10c and 10d are each a developed view of the embodiment shown in FIG. 10 illustrating the method of fabricating this embodiment and the layout of the apertures and slots therein.

FIGS. 10a, 10b, 10c and 10d illustrate the basic method steps in fabricating this embodiment. FIG. 10a shows in a developed, two dimensional view, the entire periphery of the nested tubular members 200 and 202 at a stage where apertures have been formed. It will be noted that the center line representing the flexure plane of the flexure blade in the outer tubular member 202, namely flexure blades 280 and 244 are parallel and the center lines of flexure blades 255 and 268 are also parallel. Moreover, the center lines, i.e. flexure planes of flexure blades 280 and 244 are oriented orthogonally with respect to the center lines, i.e. flexure planes, of flexure blades 256 and 268. Of course, under each one of these four flexure blades there is a radially adjacent flexure blade in the inner tubular member 200 having surfaces in the walls of the apertures that are coplanar with the radially adjacent flexure blade in the outer tubular member. As FIGS. 10a through d are developed views, the flexure axes 203 and 205 appear twice in each of these figures.

Figure 10B:
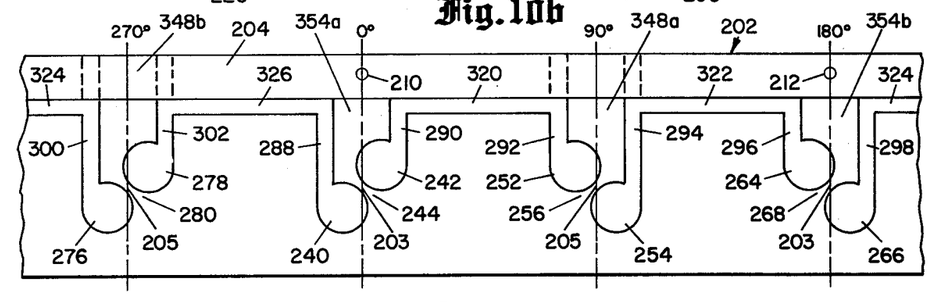
Figure 10C:
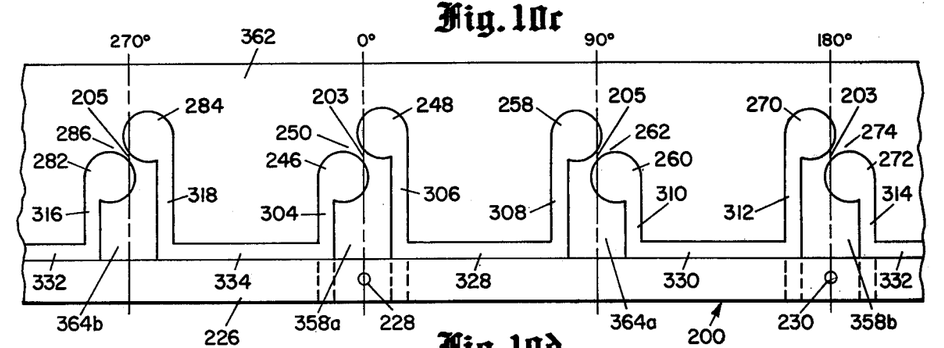

FIGS. 10b and 10c show tubular members 200 and 202 in an exploded view at a stage after the slots have been made. Note that the slots have been formed but member 200 has not been rotated with respect to member 202. Even though each of the pair of apertures in the inner tubular member 200 is in alignment with a pair of apertures in the outer tubular member 202, the slots are not in alignment as can also be seen from FIG. 9 and therefore the slots of this embodiment may not be formed with members 200 and 202 in a coaxial common nested position.

Figure 10D:
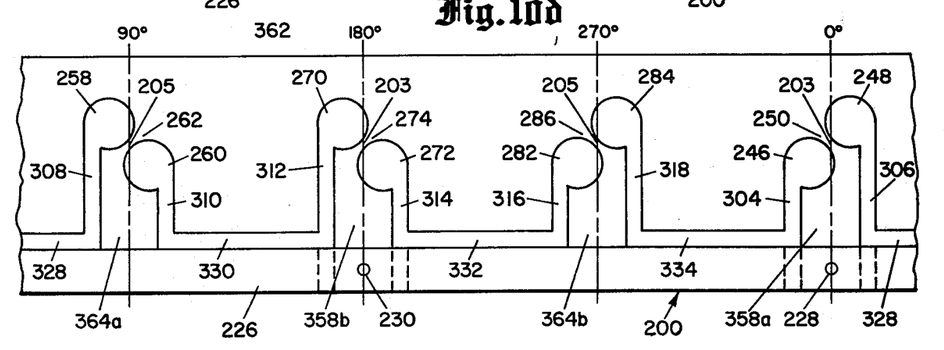
Figure 11:
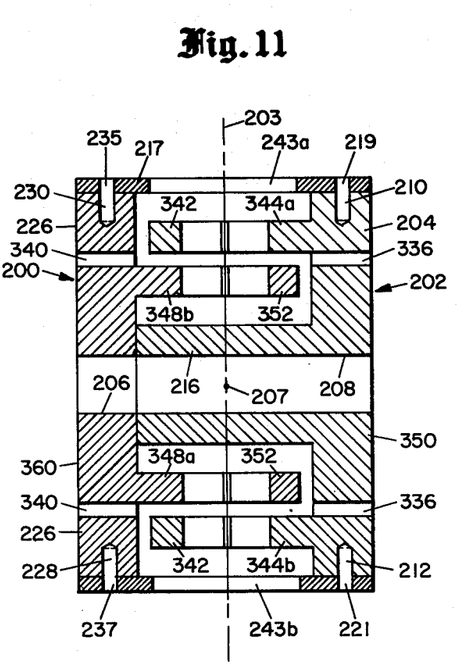
FIGS. 11, 12 and 13 are an orthographic projection of the embodiment shown in FIG. 9.

FIG. 10d should be viewed in conjunction with FIG. 10b. FIG. 10d shows the inner tubular member 200 as seen in FIG. 11c, but rotated through an angle of 180° with respect to outer tubular member 202 which remains in the position shown in FIG. 10b. This rotation is schematically indicated by the changing locations of the vertical directed lines labeled 0°, 90°, 180°, and 270°. From a super imposition of FIGS. 10b and 10c, which would represent the concentrical assembly as shown in FIG. 10, it may be seen that each pair of radially adjacent flexure blades, namely flexure blade pairs 244 and 274, 256 and 287, 268 and 250, 280 and 262, are mutually orthogonally oriented and therefore satisfy the requirement for isoelasticity.

The axial and peripheral slots in members 200 and 202 may be formed using conventional machining techniques. The location of the slot does not, of course, affect the accuracy with which axes 203 and 205 intersect at the desired common pivot point 207 on axis 201, see FIG. 9. The slots may be formed utilizing indexing block 209 and a spud and spacer similar to spud 13 and spacer 15 shown in FIG. 2.

Slots are first formed in one tubular member and then in the other tubular member. In other words, the steps of forming slots are performed separately for inner tubular member 200 and repeated for outer tubular member 202.

Figure 12:
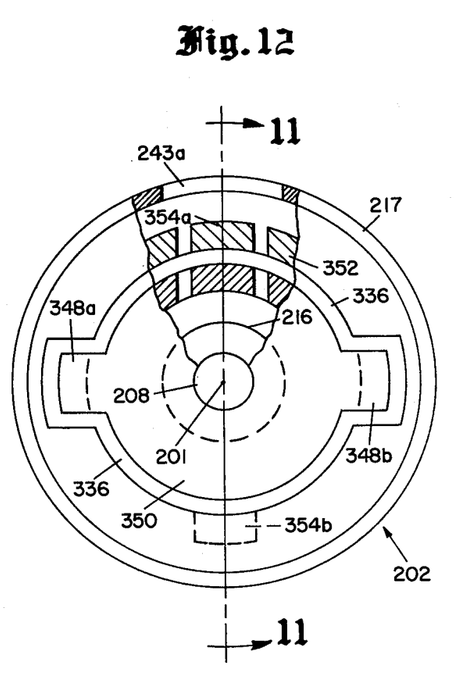
Figure 13:
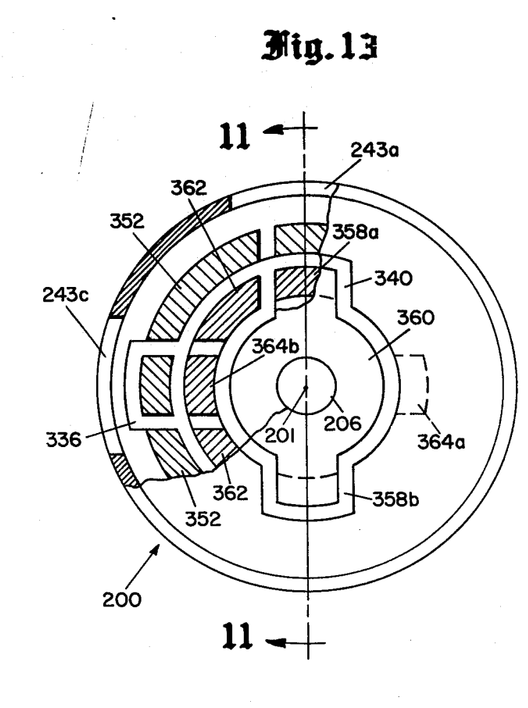

A tool 345a (not shown) similar to tool 145 would be used to form slot 336, FIGS. 11 and 12. Slot 336 divides the outer tubular member into outer driving elements 348a and 348b; hub 350; outer gimbal element 352; and outer driven element 354a and 345b. That is, slot 336 is the last cut separating an outer driving element from a gimbal element and from a driven element, except for flexure blades 244, 250, 256, etc. Outer driving elements 348a and 348b are portions of outer tubular member 202 which connect flexure blades 256 and 280 to hub 350. Hub 350 includes aperture 208 for receiving a drive shaft. Outer driven elements 354a and 354b connect flexure blades 244 and 268 to flange 204. Thus it may be seen from FIGS. 10b and 10d that flexure blades 244 and 268 are rotor-attached and flexure blades 256 and 280 are shaft-attached, i.e. they connect to the drive shaft (not shown) and to the rotor (not shown) respectively.

Similarly, a tool 345b (not shown) similar in shape to tool 145 may be used to form slot 340. Slot 340, FIG. 13, partitions inner tubular member 200 into outer driving elements 348a and 348b; hub 360; outer gimbal element 352; and outer driven elements 354a and 354b. From FIG. 10d it may be seen that flexure blades 274 and 250 are shaft-attached and flexure blades 262 and 286 are rotor-attached.

Thus the embodiment shown in FIGS. 9-13 has two independent intermediate gimbal elements, each having two shaft-attached flexure blades and two rotor-attached flexure blades oriented orthogonally to the first two flexure blades. The two gimbal elements of this embodiment will cancel rectification torques caused by vibrations of the drive shaft occurring at twice the spin speed of the drive shaft in the manner taught and claimed in U.S. Pat. No. 3,678,764.

Thus the fabrication of the embodiment of FIGS. 9-13 is complete. Tubular members 200 and 202 may be bonded to sleeve 217 to maintain their axial and radial orientation in the precise alignment in which they were fabricated.

Consider now the embodiment of the invention shown in FIG. 14. The embodiment of FIG. 14 is identical to the embodiment shown in FIGS. 9-13, except that it is not adapted to cancel rectification torques caused by angular vibrations at twice the spin frequency in the manner taught and claimed in U.S. Pat. No. 3,678,674. Because of the absence of this feature, the embodiment of FIGS. 9-13 with two gimbal elements is clearly preferable over the embodiment of FIG. 14. The embodiment of FIG. 14 is one illustration of the breadth of the novel method of fabricating flexure hinge assemblies.

Figure 14A:
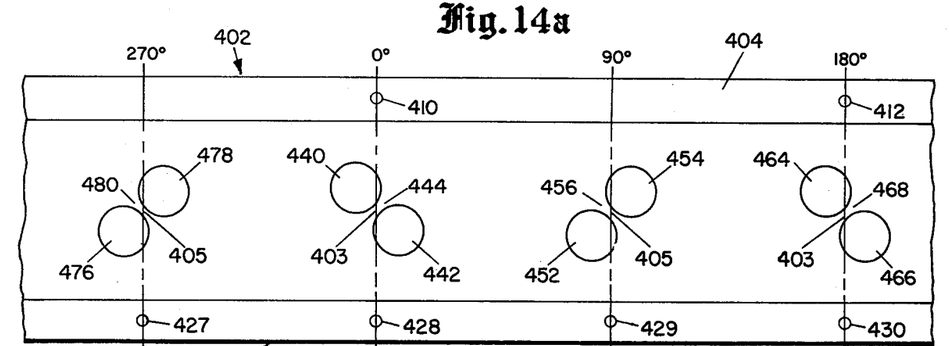
FIGS. 14a, 14b, 14c and 14d are each a developed view of an embodiment similar to the embodiment of FIGS. 9–13 and illustrate the method of fabrication of this embodiment and the layout of apertures and slots therein.
Figure 14B:
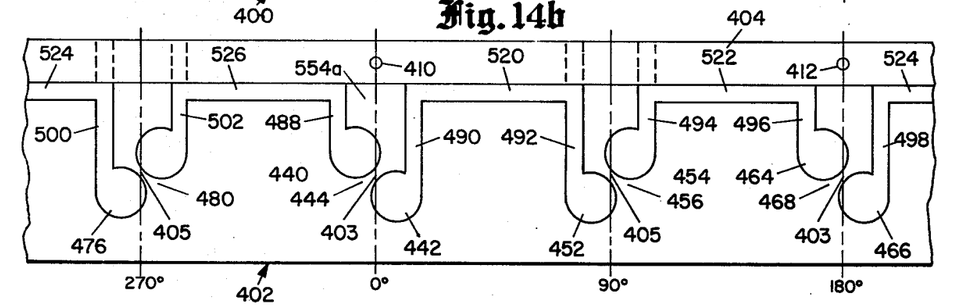
Figure 14C:
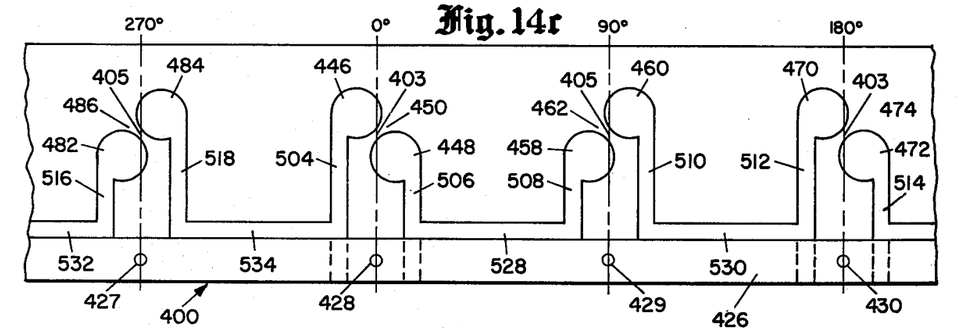

Note that FIGS. 14b and 14c show a pattern of apertures forming flexure blades in inner tubular member 400 and outer tubular member 402 which is different from that of FIGS. 10b and 10c. The pattern of center lines of the flexure blades of FIGS. 14b and 14c alternates in direction every 90°.

Figure 14D:
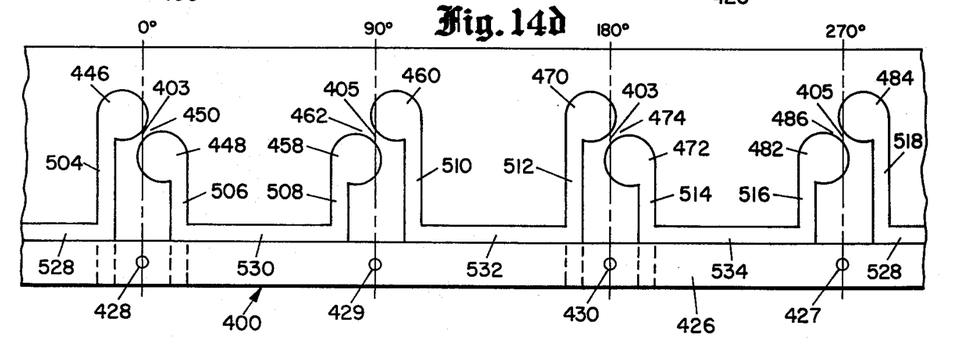

It may be seen from FIGS. 14b and 14d that the shaft-attached flexure blades of both members 400 and 402 are circumferentially aligned with one another and the rotor-attached flexure blades are aligned with one another. That is, rotor-attached flexure blades 444 and 462 are circumferentially aligned, rotor-attached flexure blades 468 and 486 are circumferentially aligned, shaft-attached flexure blades 480 and 450 are circumferentially aligned and shaft-attached flexure blades 456 snd 474 are circumferentially aligned. Thus it is seen in FIGS. 10b and 10d that one rotor-attached flexure blade and one shaft-attached flexure blade is circumferentially positioned at each 90° interval.

DESCRIPTION OF A DEVICE EMBODYING THE INVENTION

Figure 15:
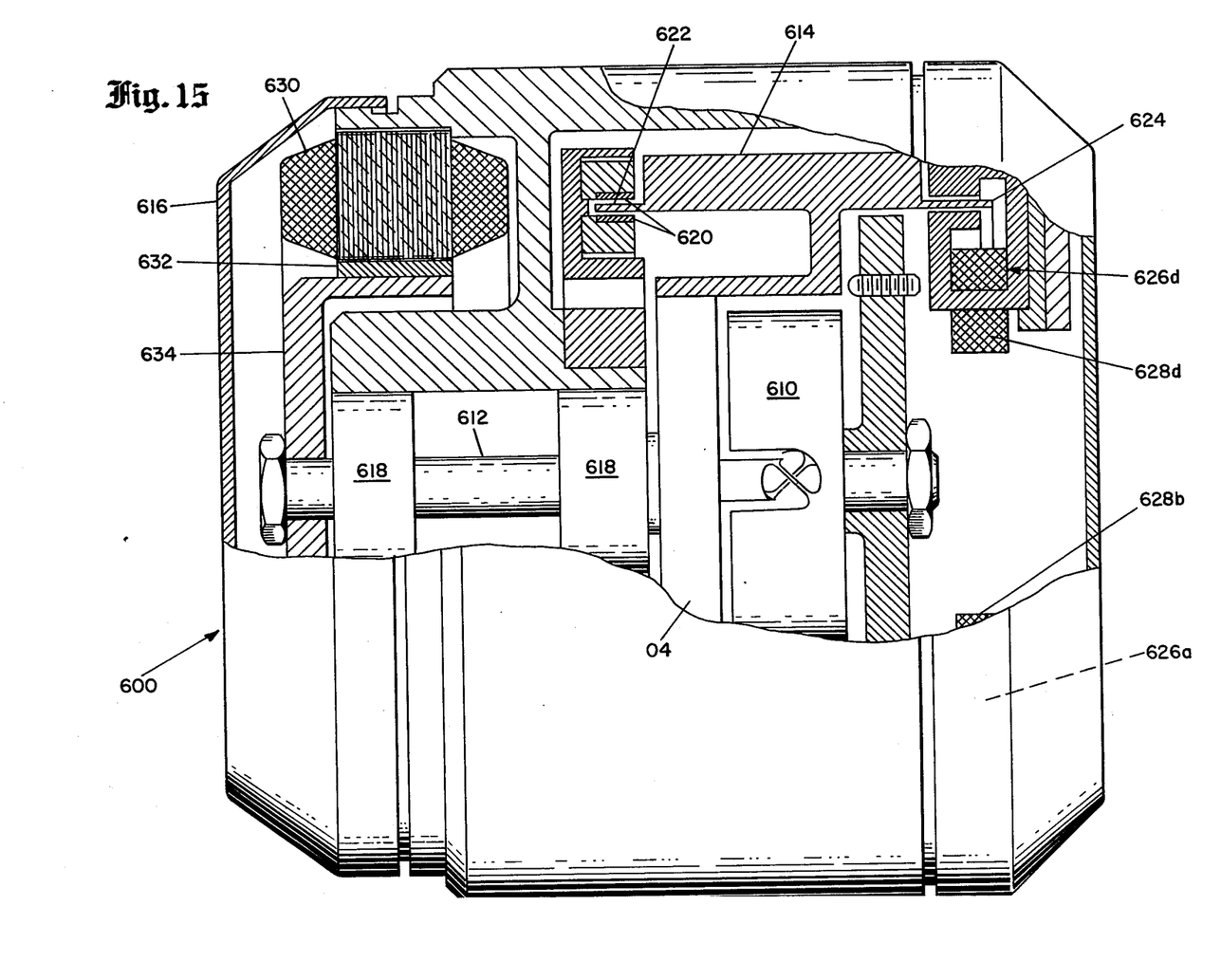
FIG. 15 is a cross-sectional view of a gyroscope incorporating the completed embodiment of the flexure hinge assembly shown in FIGS. 5, 6, 7 and 8.

Referring now to FIG. 15 there is shown a cross-section of a free-rotor flexure-suspended gyroscope 600. Flexure hinge assembly 610 is shown as the embodiment of FIGS. 1-8 but all of the embodiments shown herein and other embodiments of the invention may be utilized as the means for suspending the rotor of a gyroscope. The gyroscope shown in FIG. 15 includes a flexure hinge assembly 610, a drive shaft 612, and an inertial wheel 614. The flexure hinge assembly 610 interconnects drive shaft 612 and inertial wheel 614. Inertial wheel 614 may be bonded to flange 04 of flexure hinge assembly 610.

The operating principle of the gyroscope is based on angular decoupling of a spinning gyro rotor such as inertial wheel 614 from a drive shaft 612. To understand this concept consider the connection between the wheel and shaft to be a frictionless universal joint. In such a universal joint there would be minimal restraint to angular motion between the wheel and shaft. In addition such a universal joint provides high resistance to translational motion parallel and perpendicular to the spin axis.

When the moment of inertia of each of the gimbal elements is adjusted in accordance with a tuning equation, the spinning rotor is free to deflect through small angles without experiencing reaction torques. Thus a substantially frictionless universal joint is achieved. This concept is explained in more detail in U.S. Pat. No. 3,678,764. The dry, i.e. fluidless, tuned rotor feature eliminates all of the disadvantages of pigtail power leads, mass instability, radiation sensitivity, fluid stratification, gimbal pivots. etc. which are common to fluid-filled gyroscopes.

In FIG. 15 it can be seen that the inertial wheel 614 is attached to flange 04 and driven elements 154a, 154b, 164a and 164b and, in turn, through flexure blades to the gimbal elements 152 and 162. Gimbal elements 152 and 162, which are bonded together, are attached to the drive elements 148a, 148b, 158a and 158b by flexure hinges. The inertial wheel 614 and flexure hinge assembly 610 comprise the entire sensitive element. As shown in FIG. 15 the shaft 612 is supported by a housing or case 616 with a pair of preloaded ball bearings 618. Ball bearings in this instrument are not part of the sensitive element and therefore have no influence on mass imbalance of the inertial wheel 614.

Capacitance pickoffs comprising a plurality of plates 620, in cooperation with flange 622 of inertial wheel 614, form four capacitor pairs for sensing angular motion of the gyro housing relative to the rotor element. The pickoff signals may then be nulled by torquers and servo loops (not shown) and thereby providing two axes of inertial stabilization of angular rate measurements. The four capacitance pickoffs are equi-angularly spaced around the flange 622 (only one pickoff being shown in FIG. 15).

A means for applying eddy current torque to the inertial wheel 614 is shown in FIG. 16. A second conductive flange 624 is positioned around and at the other side of inertial wheel 614. Flange 624 fits into the gaps of four circumferentially symmetrically disposed electromagents 626a, 626b, 626c, and 626d (only magnet 626d is shown in FIG. 15). Each of the electromagnets has an electric coil which is connected to be controlled by — for example — control means such as computers or servo means (not shown). The coils of the electromagnets are 628a, 628b, 628c, and 628d (two of which are shown in FIG. 15). The electromagnets are supported on a bracket attached to housing 616. When it is desired to apply a torque to inertial wheel flange 624 about an axis (not shown) passing through magnets 626a and 626c, magnets 626a and 626c are energized. The eddy currents induced in flange 624 react with the flux field to produce this torque. When it is desired to apply a torque to flange 624 about an axis (not shown) passing through the center of magnets 626b and 626d, magnets 626b and 626d are energized.

Isolation from external magnetic fields is provided by housing 616 which may be made of a high permeability steel.

The spin motor may be a three-phase hysteresis synchronous motor to drive the shaft 612, flexure hinge assembly 610, and inertial wheel 614 at a desired speed. The spin motor comprises stator windings 630, hysteresis ring 632 and web 634.

DISCUSSION OF THE PRIOR ART

The following U.S. patents relate to flexure hinge assemblies for use in gyroscopes: U.S. Pat. Nos. 2,995,938, 3,077,785, 3,301,073, 3,354,726, 3,427,828, 3,512,419, 3,527,062, 3,538,776, 3,585,866, 3,614,894, 3,678,764, 3,700,289, 3,700,290, 3,709,045, 3,811,172, 3,832,906 and 3,856,366. None of these patents appear to teach or show a flexure hinge assembly having a driving element and a driven element displaced in the same axial direction from the center of suspension of the flexure hinge assembly.

We claim:

1. A flexure hinge assembly comprising:

a pair of inner and outer concentric tubular members secured to one another, each of said tubular members having a plurality of pairs of adjacent apertures extending through the wall thereof and each of said pairs of apertures forming a flexure blade defining a first plane of flexure including therein a radial flexure axis and a longitudinal axis perpendicular to said flexure axis the plane of flexure of each blade in said inner tubular member being oriented substantially perpendicular to the plane of flexure of a flexure blade in said outer tubular member, a pair of mutually adjacent flexure blades with substantially perpendicularly oriented flexure planes defining a common flexure axis to form a flexure hinge;

said inner tubular member having a driven element portion, a gimbal element portion, and a driven element portion, connected to a pair of inner flexure blades, said outer tubular member having a driving element portion, a gimbal element portion and a driven element portion, each said inner gimbal element portion connected to said driving element portion and to said inner driven element portion by a pair of juxtaposed flexure blades, respectively, each said outer gimbal element portion connected to said outer driving element portion and to said outer driven element portion by a pair of juxtaposed flexure blades, respectively; and said inner driving element portion and said inner driven element portion being axially displaced in the same direction from their respective flexure axes, said outer driving element portion and said outer driven element portion being axially displaced in the same direction from their respective flexure axes.

2. The device as claimed in claim 1 wherein each of said tubular members has two pair of adjacent apertures extending through the wall thereof, wherein the flexure axes of four flexure blades in said inner flexure blades and the flexure axes of four flexure blades in said outer tubular member all intersect at a common pivot point, and wherein said driving element portion and said driven element portion of each said tubular member are displaced in the same axial direction from said common pivot point.

3. A flexure hinge assembly comprising:
a tubular member having two pairs of adjacent aperatures extending through the wall thereof and each of said pair of apertures forming a flexure blade having a radial flexure axis, said flexure axes intersecting at a common pivot point;
said tubular member being divided into a driving element portion, a gimbal element portion and a driven element portion by a plurality of slots interconnecting said apertures, one pair of said flexure blades connecting said driving element portion to said gimbal element portion, another pair of said flexure blades connection said gimbal element portion to said driven element portion; and
said driving element portion and said driven element portion being displaced in the same axial direction from said common pivot point.

4. A flexure hinge assembly comprising:
a pair of inner and outer concentric tubular members secured to one another, each of said tubular members having two pairs of adjacent apertures extending through the wall thereof and each of said pairs of apertures forming a flexure blade defining a plane of flexure having a radial flexure axis, the plane of flexure of each flexure blade in said inner tubular member being oriented substantially perpendicularly to the plane of flexure of a radially adjacent flexure blade in said outer tubular member, a pair of radially adjacent flexure blades having substantially perpendicularly oriented flexure planes and a common flexure axis to form a flexure hinge, the flexure axes of all said flexure hinges intersecting at a common pivot point;
said inner tubular member having slots interconnecting said apertures to form an inner driving element portion, an inner gimbal element portion and an inner driven element portion, the flexure blades of a first pair having a common first inner flexure axis and flexibly connecting said inner driving element portion to said inner gimbal element portion, the inner flexure blades of a second pair having a common second inner flexure axis and connecting said inner gimbal element portion to said inner driven element portion;
said outer tubular member having slots interconnecting said apertures to form an outer driving element portion, an outer gimbal element portion and an outer driven element portion, the inner flexure blades of a first pair having a common first outer flexure axis and flexibly connecting said outer driving element portion to said outer gimbal element portion, the outer flexure blades of a second pair having a common second outer flexure axis and flexibly connecting said outer gimbal element portion to said outer driven element portion; and said inner driving element portion and said inner driven element portion displaced in the same axial direction from said common pivot point, said outer driving element portion and said outer driven element portion displaced in the same axial direction from said common pivot point.

5. The device as claimed in claim 4 wherein said inner driving element portion of said inner tubular member includes a hub, said hub being connected to said first pair of inner flexure blades, said hub including means for connecting said inner tubular member to a drive shaft.

6. The device as claimed in claim 5 wherein said outer driving element portion of said outer tubular member is displaced from said common pivot point in the same axial direction as said inner driving element portion and is secured to said inner driving element portion of said inner tubular member and wherein said inner driven element portion of said inner tubular member is secured to said outer driven element portion of said outer tubular member.

7. The device as claimed in claim 6 wherein said inner gimbal element portion and said outer gimbal element portion are fixedly secured to one another to form a flexure hinge assembly effectively having a single gimbal element, said inner and outer tubular members positioned relative to one another to substantially colinearly align said first inner flexure axis with said first outer flexure axis.

8. The device as claimed in claim 6 wherein the outer diameter of said inner gimbal element portion is shorter than the inner diameter of said outer gimbal element portion to permit independent rotation of said inner and outer gimbal element portions through small angles.

9. The device as claimed in claim 4 wherein the inner driving element and the inner driven element portions of said inner tubular member ard both displaced in the opposite axial direction from said common pivot point as the outer driving element and the outer driven element portions of said outer tubular member, said inner and outer gimbal element portions of said inner and outer tubular members being at least partially nested.

10. The device as claimed in claim 9 wherein said inner driving element portion includes a first hub for connecting said inner tubular member to a drive shaft and said outer driving element portion includes a second hub for connecting said outer tubular member to a drive shaft.

11. The device as claimed in claim 10 wherein said first hub is located at one end of said inner tubular member and is connected to said inner gimbal element portion by said first pair of inner flexure blades and wherein said second hub is located at one end of said outer tubular member and is connected to said outer gimbal element portion by said first pair of outer flexure blades.

12. The device as claimed in claim 11 further including a third tubular member, said third tubular member being positioned coaxially within said inner and outer tubular members, said third tubular member extending between said first and second hubs to limit the nesting of said inner and outer tubular members so that said flexure axes intersect at said common pivot point.

13. The device as claimed in claim 12 wherein the outer diameter of said inner gimbal element portion is substantially equal to the inner diameter of said outer gimbal element portion and said inner and outer gimbal element portions are fixedly connected to form a flexure hinge assembly effectively having a single gimbal element, said first inner flexure axis being substantially colinear with said first outer flexure axis.

14. The device as claimed in claim 12 wherein the outer diameter of said inner gimbal element portion is shorter than the inner diameter of said outer gimbal element portion permit independent rotation of said inner and outer gimbal element portions through small angles.

15. The device as claimed in claim 14 wherein said inner tubular member is coaxially positioned one with respect to said outer tubular member with said first inner flexure axis substantially colinear with said first outer flexure axis.

16. The device as claimed in claim 15 wherein said inner tubular member is coaxially positioned with respect to said outer tubular member with said first inner flexure axis substantially orthogonal to said first outer flexure axis.

* * * * *